J. M. HEIGES.
Cultivators.

No. 134,665.

2 Sheets--Sheet 1.

Patented Jan. 7, 1873.

WITNESSES.
Villette Anderson
Geo. E. Uphau

INVENTOR.
John M. Heiges
Chipman Hosmer & Co.
Attys

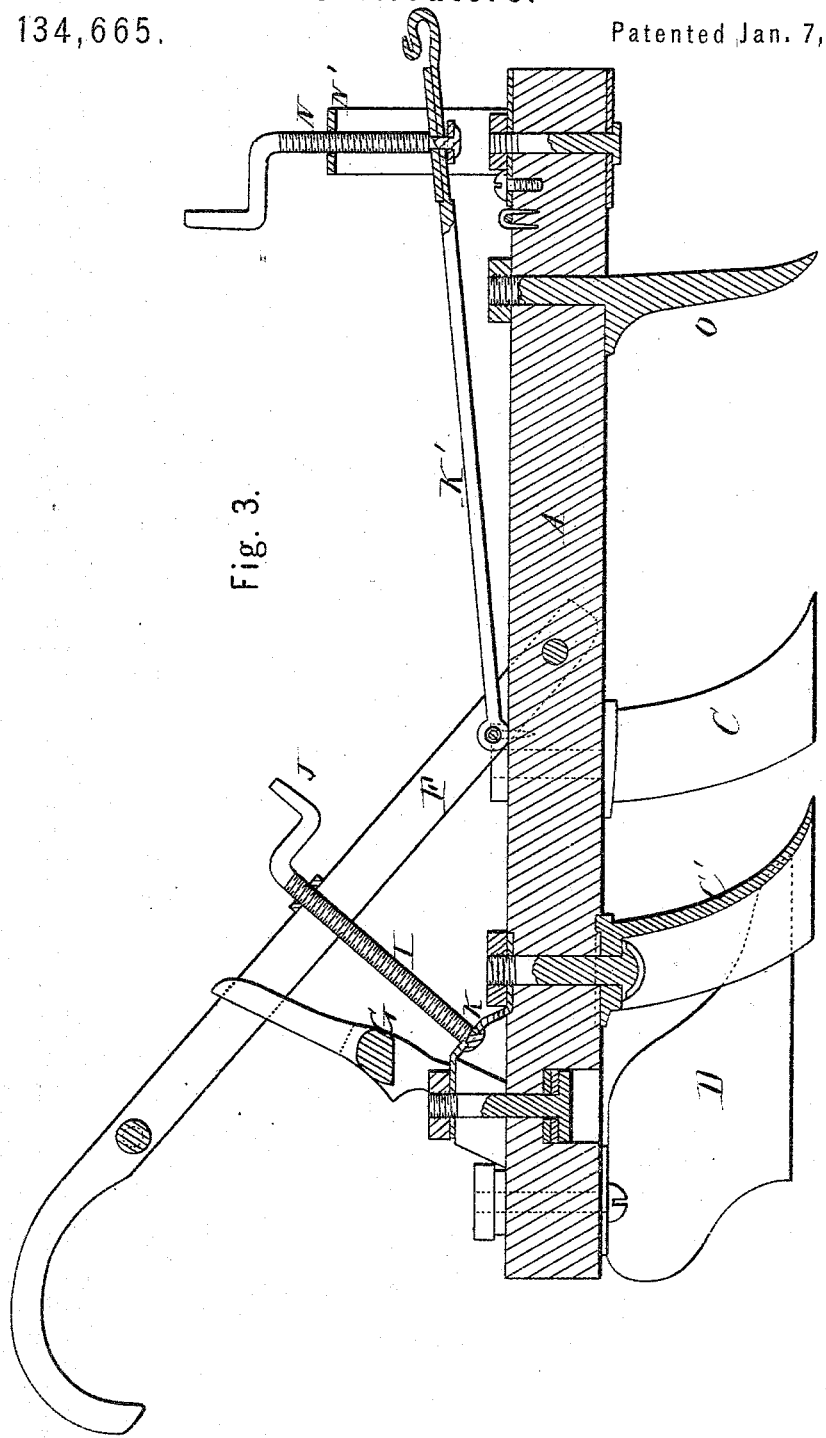

UNITED STATES PATENT OFFICE.

JOHN M. HEIGES, OF YORK, PENNSYLVANIA.

IMPROVEMENT IN CULTIVATORS.

Specification forming part of Letters Patent No. 134,665, dated January 7, 1873.

*To all whom it may concern:*

Be it known that I, JOHN M. HEIGES, of York, in the county of York and State of Pennsylvania, have invented a new and valuable Improvement in Cultivators; and I do hereby declare that the following is a full, clear, and exact description of the construction and operation of the same, reference being had to the annexed drawing making a part of this specification, and to the letters and figures of reference marked thereon.

Figure 1:
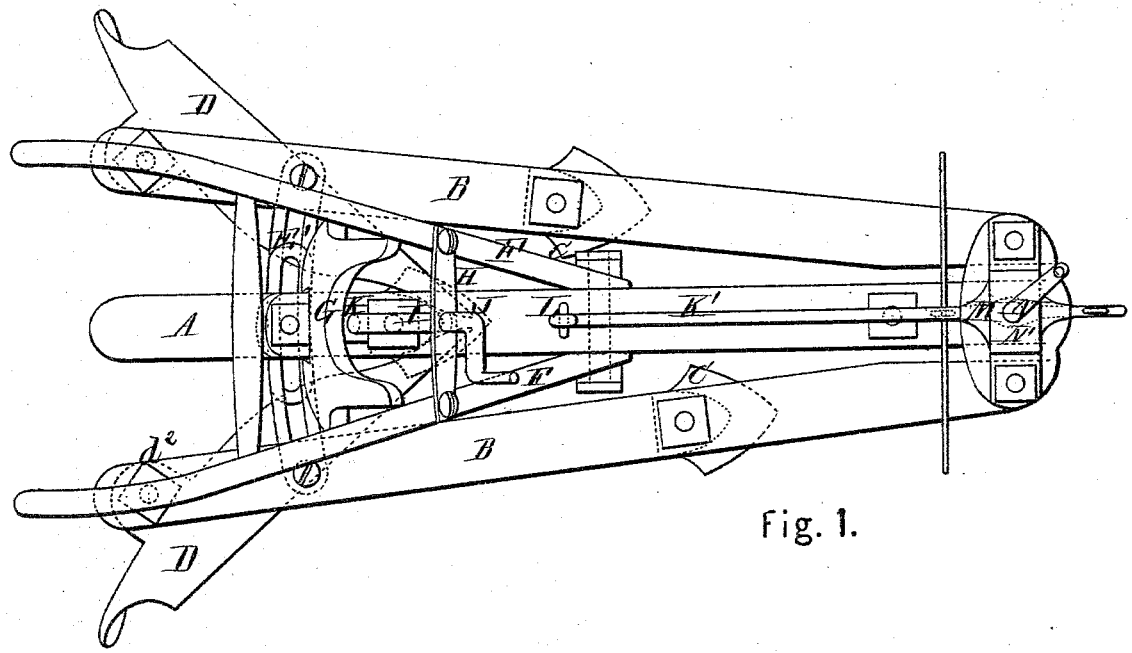
Figure 2:
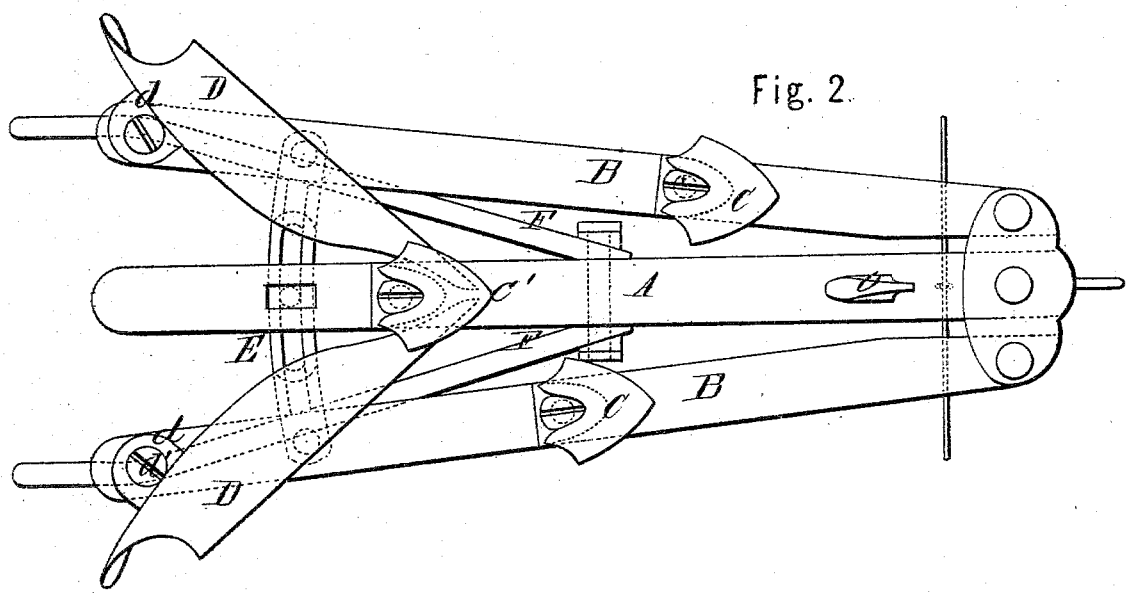

Figure 1 of the drawing is a representation of a top view of my invention; Fig. 2 is a bottom view of the same.

My invention has relation to cultivators; and it consists in the construction and novel arrangement of a pair of pivoted adjustable mold-boards, substantially as hereinafter more fully described.

Referring to the drawing, A designates the central beam of a cultivator, to the front end of which are hinged the oblique adjustable beams B. C C' designate the cultivator-teeth, of which one is attached to each of the beams A B. D denotes a pair of curved mold-boards, having each an ear, $d$, by which it is pivoted to a beam, B, at the rear end thereof. These mold-boards turn upon bolts $d^1$, holding nuts $d^2$. The mold-boards have long points, which may be brought against the sides of the central tooth so as to give to the mold-boards the positions of continuations or wings of said tooth to dispose of the earth raised by it. The mold-boards may be turned to any desired position, in which they will be held by tightening the nuts $d^2$. It will be perceived that the teeth are longer than the mold-boards—that is, the distance from the frame to the bottoms of the teeth is greater. Hence, when the former pass through the earth digging up roots, the latter follow and lift them out instead of cutting them, the soil being softened or pulverized. The beams B are connected to the beam A by means of the slotted adjusting-arms or bars E'. F designates the cultivator-handles, pivoted to the sides of the beam A and resting on the lateral offsets of an oblique standard, G, secured to the beam A. The handles are connected by means of a transverse plate, H, through which works a threaded rod, I, having a crank-arm, J, and set in an oblique plate, K, the screw itself being oblique. By means of said screw the handles may be adjusted to any required height. K' designates the draft-pole hinged to the beam at L, and provided near its forward end with a lateral enlargement, M, to which is attached a crank-screw, N, working through the top of an arch, N'. By means of said screw the draft-beam may be raised or lowered to any necessary extent. O represents a cleaning-tooth, attached to the beam A near its forward end.

What I claim as my invention, and desire to secure by Letters Patent, is—

The curved mold-boards D, having flanges $d$ at the upper rear end, pivoted to the rear ends of beams B B, and so arranged that the points of said mold-boards may be brought against the sides of the central tooth or turned to any desired position, substantially as specified.

In testimony that I claim the above I have hereunto subscribed my name in the presence of two witnesses.

JOHN M. HEIGES.

Witnesses:
PHIL. C. MASI,
JOS. B. LOOMIS.